(12) United States Patent
Jaynes

(10) Patent No.: US 6,983,209 B2
(45) Date of Patent: Jan. 3, 2006

(54) TEMPERATURE CORRECTED TIRE PRESSURE GAUGE AND METHOD

(76) Inventor: Harry M. Jaynes, 14959 NE. 95th St., Redmond, WA (US) 98052

( * ) Notice: Subject to any disclaimer, the term of this patent is extended or adjusted under 35 U.S.C. 154(b) by 0 days.

(21) Appl. No.: 10/358,472

(22) Filed: Feb. 5, 2003

(65) Prior Publication Data

US 2004/0153281 A1    Aug. 5, 2004

(51) Int. Cl.
*G01F 17/00* (2006.01)

(52) U.S. Cl. .................................... 702/50; 73/146.2

(58) Field of Classification Search ............... 702/50, 702/47, 138, 130, 87; 73/146.2, 146; 340/442; 152/415; 374/137; 701/1
See application file for complete search history.

(56) References Cited

U.S. PATENT DOCUMENTS

| | | | |
|---|---|---|---|
| 4,246,930 A | | 1/1981 | Bishop et al. |
| 5,743,645 A | * | 4/1998 | Jaynes ..................... 374/137 |
| 5,878,791 A | | 3/1999 | Kane |
| 5,913,241 A | * | 6/1999 | Ohashi et al. ............. 73/146.2 |
| 6,092,028 A | * | 7/2000 | Naito et al. ................... 702/47 |
| 6,148,888 A | * | 11/2000 | Loureiro Benimeli ...... 152/415 |
| 6,155,313 A | | 12/2000 | Smalley |
| 6,374,869 B2 | | 4/2002 | Makino et al. |
| 6,470,923 B1 | | 10/2002 | Gonzaga |
| 2002/0019685 A1 | * | 2/2002 | Ries-Mueller ................. 701/1 |
| 2003/0001734 A1 | * | 1/2003 | Schofield et al. ........... 340/442 |
| 2003/0121318 A1 | * | 7/2003 | Bell et al. .................. 73/146.2 |
| 2004/0118196 A1 | * | 6/2004 | Landes et al. ................ 73/146 |

OTHER PUBLICATIONS

TURNFAST, Technical Articles, publication date unknown (Internet), Introduction to Handling, see especially Tire Pressure (Part 4 of 5).

* cited by examiner

*Primary Examiner*—Michael Nghiem
*Assistant Examiner*—Xiuqin Sun
(74) *Attorney, Agent, or Firm*—Glenn D. Bellamy; Greenebaum Doll & McDonald PLLC

(57) ABSTRACT

Disclosed is a device (10) and method for determining a temperature-corrected tire pressure. A preselected baseline temperature (26) is measured or selected. A second temperature (28) is measured using a temperature probe (22). An actual tire pressure (30) is measured (24). A programmed processor calculates and displays (14) a corrected tire pressure (32) corresponding to the baseline temperature (26) according the ideal gas law.

14 Claims, 2 Drawing Sheets

TEMPERATURE CORRECTED TIRE PRESSURE GAUGE AND METHOD

TECHNICAL FIELD

This invention relates to a method and device for calculating and/or measuring a corrected tire pressure corresponding to a change in temperature.

BACKGROUND OF THE INVENTION

Auto racing of all kinds has become increasingly popular and increasingly competitive. The highly competitive nature of the sport requires each racing team to push the limits of speed and performance in every respect. When fine tuning performance (to thus optimize speed), it is desirable to eliminate or control as many variables as possible.

Tire traction is key to the "handling" of a race car and it is well known that both tire temperature and pressure greatly affect traction. The goal of adjusting tire pressures is to maximize the overall handling grip of the car. Top professional racing teams sometimes make very minor adjustments to tire pressure (in increments as small as ¼ psig) in an attempt to optimize traction, performance, handling, and speed.

It is well known that as a car is driven, the temperature of the tires increases from the "cold" (ambient) temperature, heating the air within the tire and causing the pressure of the air to increase. Likewise, changes in ambient temperature affect the "cold" temperature of the tires and can have a significant effect on the baseline or "cold" pressure. Ambient or cold temperatures may vary greatly from race day to race day over the course of a race season that lasts several months and covers many geographically diverse cities. Moreover, ambient temperatures may vary significantly during a single day and during the duration of a single race. A cool cloudy morning, when tire inflation is first set, often develops into a hot sunny day (and vice-versa). Even in a stack of tires in the pit area, some may be exposed to full sun while others are shaded. The effect can easily be 10° F. or more. More significantly, the race crew is not likely to know the actual temperature variation of any given situation.

Although not wholly accurate, a change of 10° F. equating to a change in tire pressure of about 1 psig has been used as a "rough estimate." Being able to quantify this variable, rather than relying on rough estimates or guesswork, could make such minor tire pressure adjustments more effective and useful.

One method proposed for stabilizing tire pressure relative to temperature change is to fill the tire with substantially pure and dry nitrogen ($N_2$) gas, rather than common air, such as taught by U.S. Pat. Nos. 5,878,791; 6,155,313; 6,374,869; and 6,470,923. This approach ignores that nitrogen is equally affected by temperature according to the ideal gas law (since the number of molecules remains constant) and that water is readily drawn out of the tire compound itself such that humidity may be restored inside the tire within a matter of hours.

Another way of maintaining an essentially constant tire pressure despite temperature increases is by using a wheel mounted relief valve, such as shown in U.S. Pat. No. 4,246,930, issued Jan. 27, 1981. Unfortunately, the use of such devices has been banned by certain tracks and racing leagues. There has also been some question raised about whether these valves will function properly when subjected to the extreme centrifugal force produced at speeds in excess of 200 miles per hour. Also, these valves are not able to compensate for ambient temperature decreases.

SUMMARY OF THE INVENTION

The present invention provides a method and device for measuring and calculating a corrected tire pressure corresponding to a change in temperature.

A preselected baseline temperature is measured or selected. A second temperature is measured using an integral temperature probe or separate pyrometer device. An actual tire pressure is measured using an integral pressure gauge or a separate device and a programmed processor calculates and displays a corrected tire pressure corresponding to the baseline temperature according the ideal gas law.

Other display and/or memory functions may also be included. Other aspects and features of the present invention will be noted upon examination of the drawing, description of the best mode for carrying out the invention, and claims, all of which constitute disclosure of the present invention.

BRIEF DESCRIPTION OF THE DRAWING

Like-reference numerals are used to represent like parts throughout the various figures of the drawing wherein.

BEST MODE FOR CARRYING OUT THE INVENTION

The physical behavior of an "ideal gas," whether ordinary air (a mixture of gasses) or pure nitrogen and whether in a laboratory or a racing tire, is accurately described by the ideal gas equation:

$$pV=nRT$$

where p=pressure (usually in atmospheres), V=volume, n=quantity of gas (normally expressed in moles), R=0.08206 L atm/mol K (although this constant can be expressed in other units as well); and T=absolute temperature (Kelvin).

The pressurized gas inside a tire represents a substantially fixed quantity, unless and until adjusted. It can be assumed that the volume of the pressurized gas in a tire remains substantially constant within the normal range of operational pressures. Thus, the change in pressure resulting from a change in temperature can be expressed as:

$$\frac{P_1}{T_1} = \frac{P_2}{T_2}$$

where pressure is measured in atmospheres (1 psi=0.06805 atm= 14.504 bar) and temperature in Kelvin.

The only means available to a racing crew to adjust tire pressure is to adjust the amount of pressurized gas therein. In order to make a proverbial "apples-to-apples" comparison of the effect of slight pressure changes during the course of a race day or from week to week is to compare the effect of pressures that are corrected to a baseline temperature.

The present invention provides a device for accurately and automatically calculating a tire pressure corrected for a difference in tire temperature. That is, it allows the user to adjust tire pressure (by varying the amount of internal pressurized air) as if the tires remained at the baseline temperature. Although knowing the actual tire pressure and actual temperature is important information, comparing results obtained from different pressures over the course of the race season or even the day is more useful if the temperature variation factor is accounted for. Tire pressures may then be adjusted according to an "absolute" scale that is corrected for, and allows the user to ignore or at least automatically factor in, temperature variation. Additionally, it can provide a means for measuring and recording actual and corrected tire pressures as well as baseline and changed temperatures. Preferably, the information is displayed in converted units familiar to American (psig and ° F.) or European (bar and ° C.) racing crews, even though calculations may be made in terms of scientific units such as atmospheres of pressure and absolute temperature (Kelvin).

Figure 1:
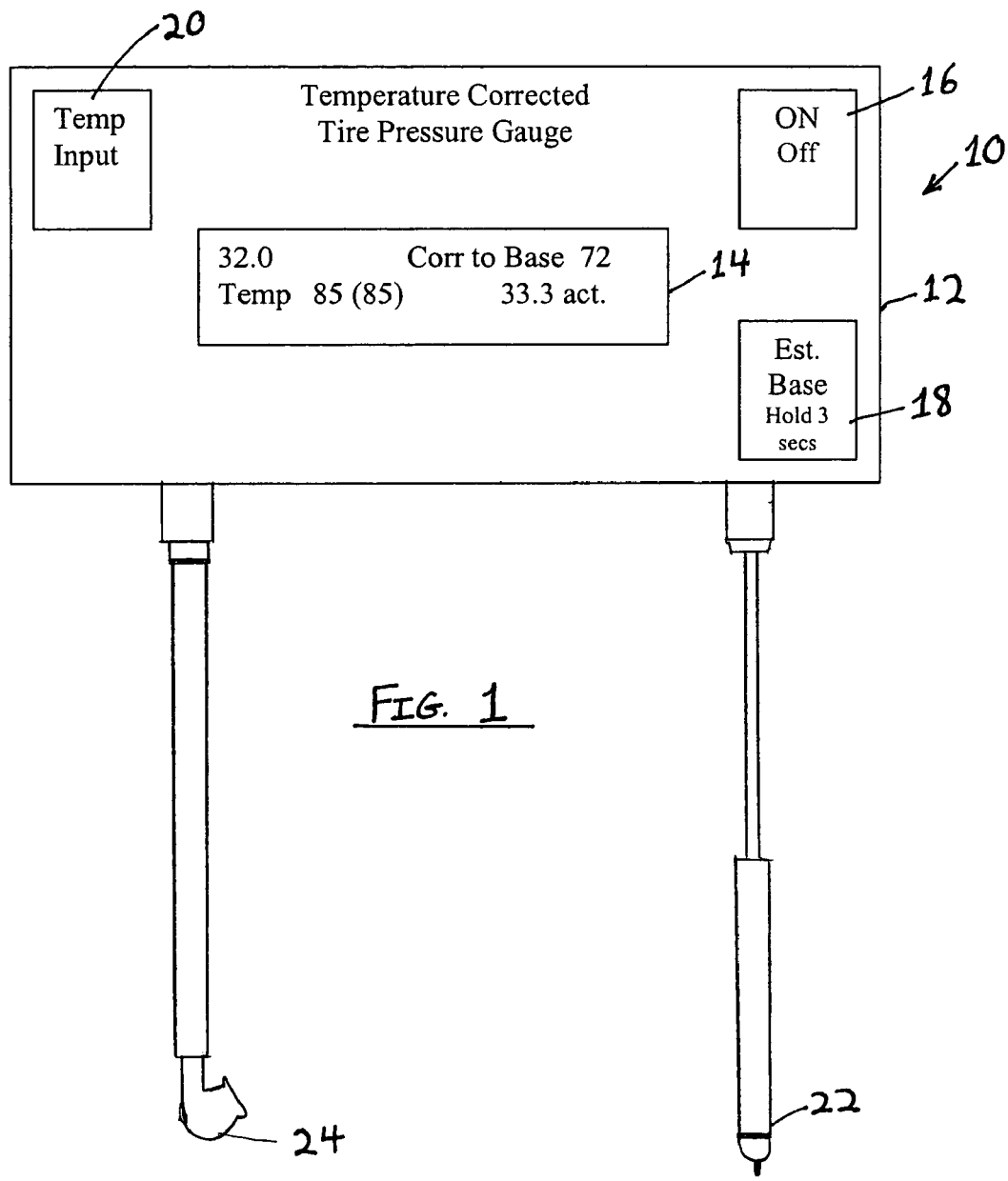
FIG. 1 is a pictorial view of a temperature correcting tire pressure gauge apparatus according to a preferred embodiment of the present invention.

Referring now to the various figures of the drawing, and first to FIG. 1, therein is shown at 10 an apparatus according to a preferred embodiment of the present invention. It may include, for example, a housing 12, one or more display screens 14, user interface buttons 16, 18, 20, a temperature probe 22, and pressure measurement hose with a tire valve stem fitting 24.

The apparatus 10 may include the functional features of an infrared or probe-type tire pyrometer and digital tire pressure gauge, which are well known devices. A multiple tire temperature memory feature as shown in my U.S. Pat. No. 5,743,645, issued Apr. 28, 1998, could also be integrated into a device embodying the present invention. Although the preferred embodiment of the apparatus of the present invention is to integrate all necessary components together into a single unit 10, alternatively, this data may be collected using separate devices and input into what is essentially a programmed calculator or computer that displays the temperature-corrected pressure information according to a method of the present invention.

Figures 2, 3:
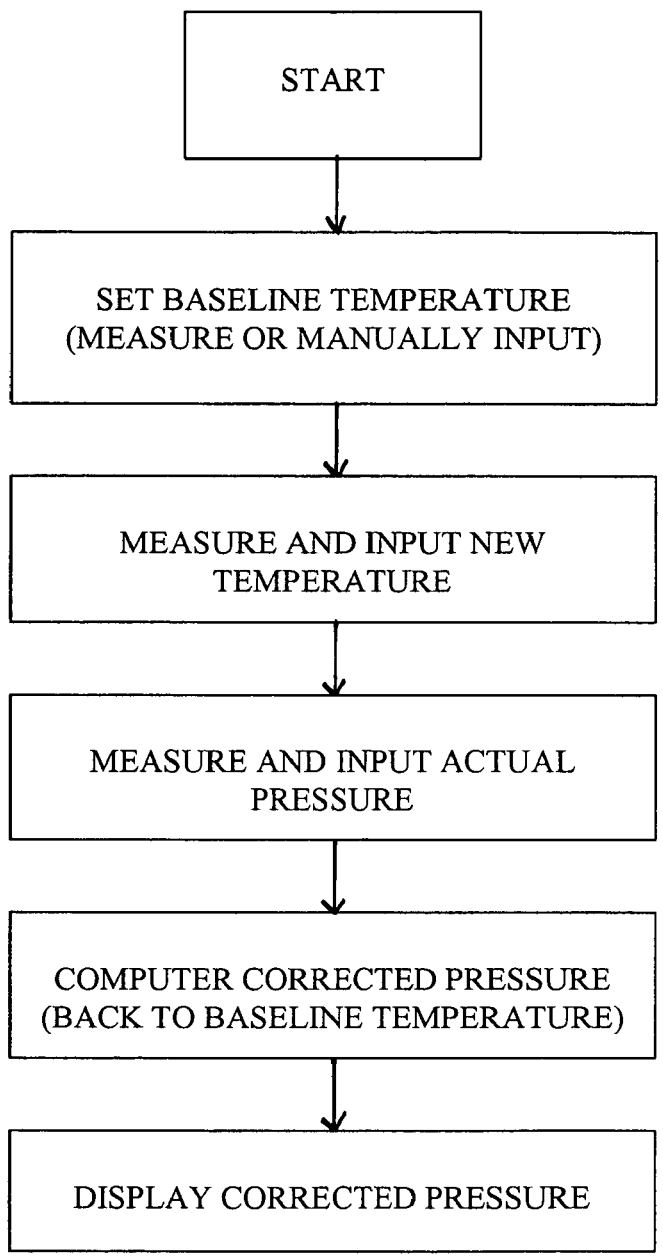
FIG. 2 is a flow chart illustrating a preferred method of the present invention.
FIG. 3 shows an example screen display.

The device 10 may be used according to the following method, as illustrated in the flow chart of FIG. 2. The device 10 is turned "ON" 16 to begin acquiring data inputs. A baseline temperature may be factory preset, selected by the user manually (not shown), or set 18 using the tire temperature probe 22. It is advisable that the baseline temperature not be changed once selected so that results from previous races or practice sessions may be noted and used for direct comparison. A baseline temperature of 72° F. is suggested as a midrange of typical ambient conditions, although the user is free to choose a different baseline. Referring to FIG. 3, the baseline temperature may be shown 26 on the display screen 14 such as on the top line [Corr to Base 72].

The user measures the actual temperature of the tire as an estimate of the temperature of the pressurized gas (air or $N_2$) therein, such as by pressing the "Temp Input" button 20 while the needle of the probe 22 is inserted into the tread compound of the tire (either on or off the car). Alternatively, an infrared thermal scanning pyrometer (not shown) of well known construction may be used or incorporated instead of a needle-type probe 22. Any other reliable means for determining or estimating the temperature of the pressurized gas in a tire may be substituted, as well. Although not considered essential, multiple temperatures readings may be taken across the face of the tread and then averaged (manually or automatically), if desired. Actual current temperature may be recorded and displayed 28, such as on the lower line of the display panel 14.

The user measures the actual gauge pressure of the tire preferably using an integrated digital gauge device 24 of well known construction. Alternatively, a pressure reading from a separate gauge (not shown) may be input manually. The actual pressure may be displayed 30 on the lower line of the display screen 14.

Using a simple microprocessor which may be appropriately programmed by a person of ordinary skill in the art, a corrected pressure corresponding to the baseline temperature is computed and displayed 32, such as on the top line of the display screen 14. For purposes of calculation, the pressure measurements may be converted in units of atmospheres and temperature must be converted to the absolute scale (Kelvin).

This display arrangement presents actual measurements (temperature and pressure) on the bottom line and corrected/baseline numbers on the top line. Any other desired format may be used. In preferred form, the display panel 14 is an LCD screen, which may be backlit, if desired. Multiple screens may be used to present the information along with units or other designation (e.g., "Corrected,""Baseline," "actual," "psig or bar," "° F. or ° C.") printed on the face of the housing 12 or depicted on screen.

If desired, the device 10 may be programmed to compute and display a target actual pressure that would be needed to achieve a target corrected pressure adjustment. For example, if the user wanted to adjust the tire pressure from a corrected pressure of 32 psig to 32.5 psig at the baseline temperature of 72° F., the device 10 could be programmed to show the user that the actual pressure (if the actual tire temperature is 95° F.) should be adjusted from 34.6 psig to 35 psig. Alternatively, the user could simply add or subtract air to or from the tire incrementally while measuring with the device 10, ignoring the actual pressure reading 30 and, instead, watching the corrected reading 32 on the display 14.

All required programming may be accomplished by a person of ordinary skill in the art using widely-available and inexpensive processor and memory chip hardware.

The embodiments shown are those which are presently preferred by the inventor. Many variations in the construction or implementation of this invention can be made without substantially departing from the spirit and scope of the invention. For example, the apparatus may exist in two or more separate parts (pressure gauge, tire pyrometer, calculator). The screen display and manner of data measurement or input may vary greatly by choice. For this reason, the embodiment illustrated and described above is not to be considered limitive, but illustrative only. The particular steps of the method described and claimed do not have to be performed in a particular order. Thus, the scope of patent rights are to be limited only by the following claim or claims interpreted according to accepted doctrines of claim interpretation, including the doctrine of equivalents and reversal of parts.

What I claim is:

1. A device for determining a temperature-corrected tire pressure, comprising:
   an input for selecting a baseline temperature;
   a temperature measuring means for determining a second temperature wherein the second temperature is the actual current temperature of said tire;
   a pressure measuring means for determining an actual tire pressure at the second temperature;

a processor for calculating a corrected tire pressure corresponding to the baseline temperature based on the actual tire pressure at the second temperature and any difference between the baseline temperature and the second temperature; and a means for displaying the calculated corrected pressure.

2. An apparatus according to claim 1, wherein the temperature measuring means includes a tire temperature probe.

3. An apparatus according to claim 1, wherein the baseline temperature is input using a temperature measuring probe.

4. An apparatus according to claim 1, further comprising memory means for recording a series of temperature and pressure measurements and calculations.

5. An apparatus according to claim 1, wherein the displaying means also displays at least one of the baseline temperature, the second temperature, and the actual tire pressure.

6. An apparatus according to claim 5, further comprising memory means for recording a series of temperature and pressure measurements and calculations.

7. A method for determining a temperature-corrected tire pressure, comprising:
   selecting a baseline temperature;
   providing a tire temperature measuring means;
   measuring actual current tire temperature as an estimation of internal air temperature;
   providing a tire pressure measuring means;
   measuring tire pressure at current temperature;
   comparing the first and second tire temperatures to determine any difference;
   calculating an adjusted tire pressure corresponding to the baseline temperature according to any determined temperature difference; and
   displaying the adjusted tire pressure.

8. The method according to claim 7, wherein the tire temperature measuring means includes a tire temperature probe.

9. The method according to claim 8, wherein the baseline temperature is selected by input from the tire temperature probe.

10. The method according to claim 7, wherein the tire temperature measuring means and tire pressure measuring means are an integral unit.

11. The method according to claim 10, wherein the tire temperature measuring means includes a tire temperature probe.

12. The method according to claim 7, further comprising providing a memory means for recording a series of temperature and pressure measurements and calculations.

13. The method according to claim 7, further comprising displaying at least one of the baseline temperature, the second temperature, and the actual tire pressure.

14. The method according to claim 13, further comprising providing amemory means for recording a series of temperature and pressure measurements and calculations.

* * * * *